United States Patent
Kim (10) Patent No.: US 8,218,193 B2
(45) Date of Patent: Jul. 10, 2012

(54) IMAGE FORMING APPARATUS TO RESIZE IMAGE AND METHOD OF RESIZING IMAGE

(75) Inventor: Ki-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1462 days.

(21) Appl. No.: 11/733,463

(22) Filed: Apr. 10, 2007

(65) Prior Publication Data

US 2008/0025642 A1 Jan. 31, 2008

(30) Foreign Application Priority Data

Jul. 25, 2006 (KR) ........................ 10-2006-0069740

(51) Int. Cl.
*G06K 15/02* (2006.01)
(52) U.S. Cl. ........ 358/1.2; 358/1.15; 358/296; 358/401; 358/1.16; 358/472; 382/167; 382/112; 382/254; 348/218.1; 348/569; 348/211.99
(58) Field of Classification Search .................. 382/298, 382/305, 167, 112, 254; 715/705; 348/218.1, 348/569, 211.99; 358/296, 401, 1.15, 1.16, 358/1.2, 472
See application file for complete search history.

(56) References Cited

U.S. PATENT DOCUMENTS

| | | | | |
|---|---|---|---|---|
| 5,696,888 A * | 12/1997 | Ikeda | ........................ | 358/1.2 |
| 2005/0134903 A1* | 6/2005 | Tanimoto et al. | ............ | 358/1.15 |
| 2005/0207644 A1* | 9/2005 | Kitagawara et al. | .......... | 382/167 |
| 2005/0238205 A1* | 10/2005 | Kimura et al. | ................ | 382/112 |
| 2006/0044601 A1* | 3/2006 | Misawa et al. | ............... | 358/1.15 |
| 2006/0103735 A1* | 5/2006 | Yang et al. | ................. | 348/218.1 |

FOREIGN PATENT DOCUMENTS

| JP | 2001-197315 | 7/2001 |
|---|---|---|
| JP | 2004-187214 | 7/2004 |
| JP | 2004-214776 | 7/2004 |

OTHER PUBLICATIONS

Tetsuya, Yoshioka, Image Reading Apparatus, Feb. 7, 2004, JP2004-187214.*

Haba, Image reading method for scanner, involves producing image file having size smaller than set maximum file size by compressing image data read in resolution determined based on maximum file size, Feb. 14, 2003, JP 2003046734 A.*

* cited by examiner

*Primary Examiner* — Benny Q Tieu
*Assistant Examiner* — Martin Mushambo
(74) *Attorney, Agent, or Firm* — Stanzione & Kim, LLP (57) ABSTRACT

An image forming apparatus capable of resizing an image, and a method of resizing the image of the image forming apparatus. A scanning unit scans a document to generate an image. A storage unit stores a target file size to be applied during storing of the generated image before the document is scanned. An image processor resizes an initial file size of the image generated by the scanning unit so that the initial file size approaches the target file size. A controller stores the image having the resized file size in at least one of an external memory connected to the image forming apparatus and the storage unit installed in the image forming apparatus. As a result, a scanned image can be resized to a size desired by a user and then stored in the external memory before the scanned image is stored.

22 Claims, 9 Drawing Sheets

IMAGE FORMING APPARATUS TO RESIZE IMAGE AND METHOD OF RESIZING IMAGE

CROSS-REFERENCE TO RELATED APPLICATIONS

This application claims priority under 35 U.S.C. §119(a) from Korean Patent Application No. 10-2006-0069740, filed Jul. 25, 2006, in the Korean Intellectual Property Office, the entire contents of which are incorporated herein by reference.

BACKGROUND OF THE INVENTION

1. Field of the Invention

The general inventive concept relates to an image forming apparatus capable of resizing an image and a method of resizing an image thereof, and more particularly, to an image forming apparatus capable of resizing a scanned image to a file size desired by a user and storing the resized image, and a method of resizing an image.

2. Description of the Related Art

A conventional image forming apparatus scans a document that has been put on a document scanning screen to generate a scanned image. The generated scanned image is generally either stored in the image forming apparatus or transmitted to a computer connected to the image forming apparatus and stored there.

With the increasing demands of users, the technology for connecting an external memory to an image forming apparatus, and directly storing a scanned image in a file format in the external memory, has recently been of interest. The size of a scanned file depends on scanning options set by a user, e.g., a particular resolution, color, size (aspect ratio), etc., and the size is not changed in the image forming apparatus.

A conventional image forming apparatus stores a scanned image file in an internal storage unit or in an external memory connected to the image forming apparatus without resizing the scanned image (without changing the file size). Thus, if the file size of the scanned image is larger than a size set to be used when the user later uses the stored scanned image, the user must reduce the file size of the scanned image (resize the file size of the scanned image) prior to use.

For example, if the user uploads a file of the scanned image stored in the external memory to a website, the user may not be permitted to directly upload the stored file of the scanned image because the website limits the size of a file which can be uploaded, and the stored file exceeds the limited size. In this case, the user must first reduce the file size using a computer application program and then re-upload the file of the scanned image.

Also, if the file size of a scanned image is larger than a size which can be stored in the external memory, the user must adjust the scanning options to reduce the file size of the scanned image and then re-scan the document.

SUMMARY OF THE INVENTION

The general inventive concept includes an image forming apparatus capable of resizing an image and a method of resizing an image. According to the general inventive concept, the file size of an image generated by scanning can be resized to approach a size designated by a user and then stored, so that the user can save the trouble of editing the file size of the image when later using the image.

The present general inventive concept provides an image forming apparatus capable of resizing an image and a method of resizing an image from the image forming apparatus by which a user can save the trouble of adjusting scanning options to reduce the size of a file larger than a size storable in an external memory and then re-scanning a document to reduce the size of the file.

Additional aspects and advantages of the present general inventive concept will be set forth in part in the description which follows and, in part, will be clear from the description, or may be learned by practice of the general inventive concept.

The foregoing and/or other aspects and utilities of the present general inventive concept may be achieved by providing an image forming apparatus capable of resizing an image, the image forming apparatus including: a scanning unit to scan a document to generate an image, a storage unit to store a target file size to be applied during storing of the generated image, an image processor to resize an initial file size of the image generated by the scanning unit so that the initial file size approaches the target file size, and a controller to store an image having the resized file size in at least one of an external memory connected to the image forming apparatus or the storage unit installed in the image forming apparatus.

The image forming apparatus may further include a display unit to display a guide message related to a quality of the resized image generated by the image processor.

If the resized file size is smaller than the initial file size, the controller may control the display unit to display a message indicating the quality of the resized image.

The controller may control the display unit to display an optimal resolution in which the resized image approaches the storage target file size.

The image forming apparatus may further include a user interface inputting the optimal resolution, wherein if the optimal resolution is input, the controller controls the scanning unit to re-scan the document and generate an image corresponding to the input optimal resolution.

The controller may control the display unit to display an optimal resolution in which the scanned image approaches the target file size before the image processor resizes the file size of the scanned image.

The image forming apparatus may further include a user interface to change the target file size, wherein the controller controls the storage unit to store the target file size changed by the user interface.

The image forming apparatus may further include an interface to which the external memory is connected.

The foregoing and/or other aspects and utilities of the present general inventive concept may also be achieved by providing an image forming apparatus capable of resizing an image, the image forming apparatus including a scanning unit to scan a document to generate an image, a display unit to display an initial file size of the generated image, a user interface to set a target file size to be applied during storing of the generated image, an image processor to resize the initial file size of the generated image so that the initial file size of the generated image approaches the set target file size, and a controller to store an image having the resized file size in at least one of an external memory connected to the image forming apparatus or an internal memory installed in the image forming apparatus.

If an enable mode to request setting of the target file size is selected at the user interface, the controller may control the display unit to display the initial file size of the image, and if a disable mode that does not request setting of the target file size is selected, the controller may store the image having the initial file size in at least one of the external or internal memories.

The target file size may be set when the initial file size is displayed.

The foregoing and/or other aspects and utilities of the present general inventive concept may also be achieved by a method of resizing an image, the method including: setting a target file size to be applied during storing of an image generated by scanning, scanning a document to generate the image if the scanning is requested, resizing an initial file size of the generated image so that the initial file size of the generated image approaches the set target file size, and storing the image having the resized file size in at least one of an external or an internal memory.

After resizing of the generated image so that the initial file size approaches the set target file size, the method may further include comparing the resized file size with the initial file size, displaying a guide message indicating the quality of the resized image if the resized file size is smaller than the initial file size.

After displaying the guide message for indicating the quality, the method may further include generating an optimal resolution in which the resized image approaches the set target file size, wherein the guide message is displayed together with the generated optimal resolution.

After displaying the generated guide message, the method may further include if the optimal resolution is input through a user interface, re-scanning the document to re-generate an image corresponding to the input optimal resolution, wherein the re-generated image is stored in at least one of the external and internal memories.

Before resizing the generated image so that the initial file size approaches the set target file size, the method may further include displaying an optimal resolution under which the scanned image has the set target file size.

The foregoing and/or other aspects and utilities of the present general inventive concept may also be achieved by providing a method of resizing an image, including scanning a document to generate an image, displaying an initial file size of the generated image, setting a target file size to be applied during storing of the generated image, resizing the initial file size of the generated image so that the initial file size approaches the target file size set previously, and storing an image having the new file size in at least one of the external or internal memories.

The method may further include: selecting either an enable mode to request setting of the target file size or a disable mode not to request the setting of the target file size, displaying the initial file size of the image if the enable mode is selected, and storing the image having the initial file size in at least one of the external or internal memories if the disable mode is selected.

The foregoing and/or other aspects and utilities of the present general inventive concept may also be achieved by providing a method of resizing an image, comprising: scanning a document to produce first image data; determining if the first image data has been converted to a coarser resolution for storage due to a requirement for more digital memory than is available in an external device; if so, then asking a user for an instruction as to whether or not the document should be re-scanned at the coarser second resolution; and rescanning the document at the coarser second resolution.

The foregoing and/or other aspects and utilities of the present general inventive concept may also be achieved by an image forming apparatus comprising: an image processor to resize a scanned image having a scanned size according to a predetermined target size; and a controller to store the resized image having the predetermined target size in a memory.

The controller may adjust the predetermined target size to a second target size according to characteristics of the scanned image and the resized image.

The image processor may resize a second scanned image having a second scanned size according to the adjusted target size, and the controller may store the resized image having the second target size in the memory.

BRIEF DESCRIPTION OF THE DRAWINGS

These and/or other aspects and advantages of the present general inventive concept will become apparent and will be more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
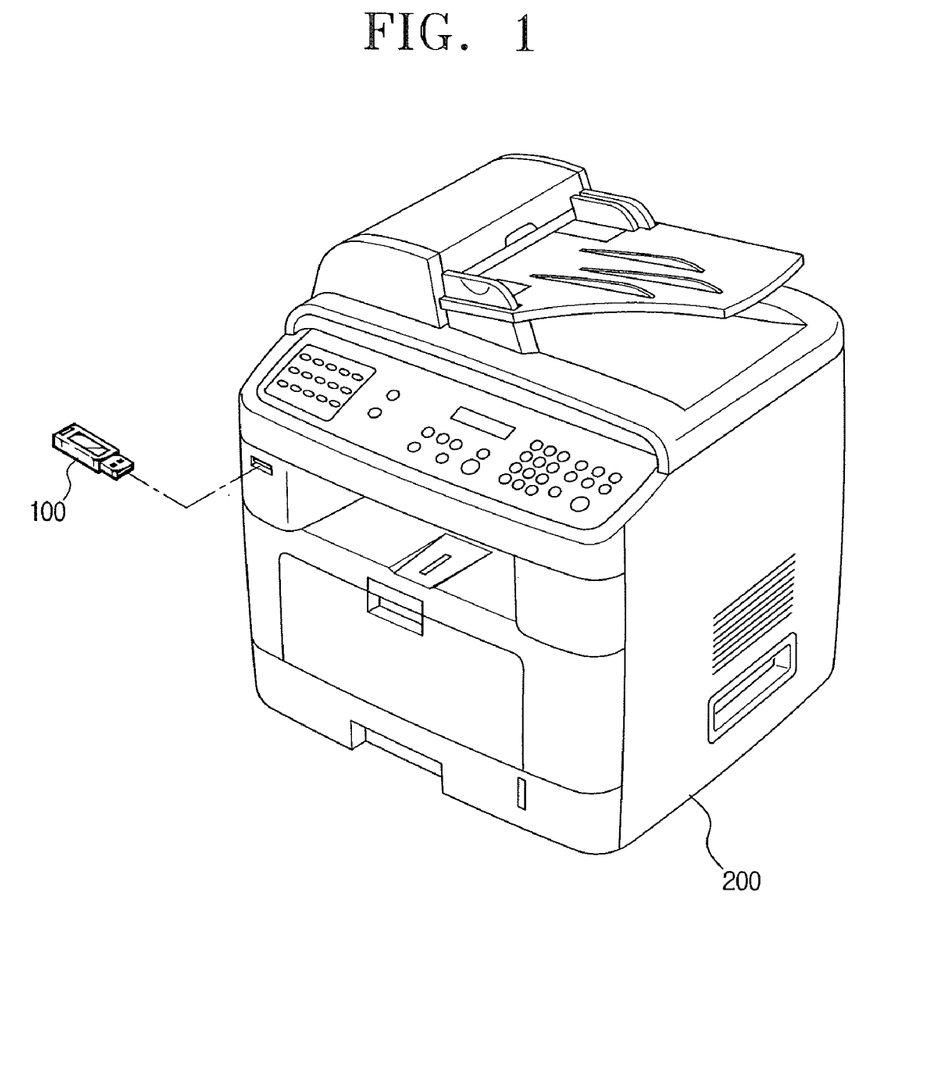
FIG. 1 is a view illustrating a system in which an external memory is connected to an image forming apparatus capable of resizing an image, according to an embodiment of the present invention general inventive concept.

FIG. 1 is a view illustrating a system in which an external memory 100 is connected to an image forming apparatus 200 capable of resizing an image, according to a first embodiment. Referring to FIG. 1, the image forming apparatus 200, capable of resizing an image, has a scanning function and resizes the file size of a scanned image to a size desired by a user and then stores the resized scanned image. The image forming apparatus 200 may be a copier, scanner, a facsimile, or a multifunction peripheral. The external memory 100 connected to the image forming apparatus 200 is a storage device attachable to and/or detachable from the image forming apparatus 200. For example, the external memory 100 may be a universal serial bus (USB) memory, a compact flash memory, a memory card, an external hard disk drive (HDD), a smart media card, a memory stick, etc.

If the image forming apparatus 200 is able to perform wireless communications, the external memory 100 may be installed in an electronic device having wireless communication with the image forming apparatus 200 and a data storage function.

Figure 2:
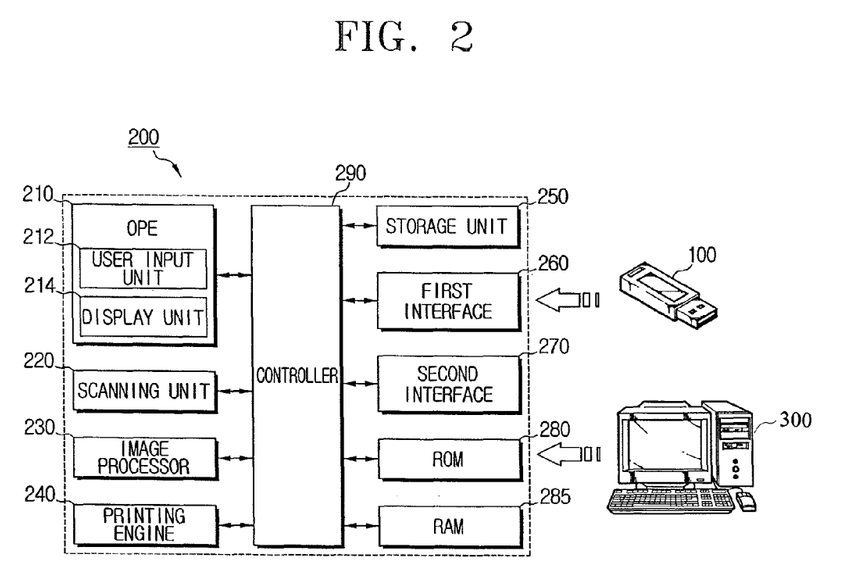
FIG. 2 is a detailed block diagram of the image forming apparatus illustrated in FIG. 1, according to an embodiment of the present invention general inventive concept.

FIG. 2 is a detailed block diagram of the image forming apparatus 200 illustrated in FIG. 1. Referring to FIGS. 1 and 2, the image forming apparatus 200 includes an operating panel equipment (OPE) 210, a scanning unit 220, an image processor 230, a printing engine 240, a storage unit 250, a first interface 260, a second interface 270, a read only memory (ROM) 280, a random access memory (RAM) 285, and a controller 290.

The OPE 210 includes a user input unit 212 and a display unit 214 to provide an interface between a user and the image forming apparatus 200. The user input unit 212 transmits signals used to select, manipulate, and request functions supported by the image forming apparatus 200 to the controller 290, and includes various function keys and a touch screen.

The user input unit 212 includes a user input that sends a selection signal to the controller 290 so as to select a "Scan to External Memory" mode (hereinafter referred to as a first mode) in which an initial file size of an image generated by the scanning unit 220 is resized, and then the image is stored in the external memory 100 or the storage unit 250. The user inputs, through the input unit 212, a file size to be applied during resizing and storing of the scanned image, which herein is denoted as the target file size. The target file size input by the user is that file size which the user desires to store the scan data in the external memory 100 or the PC 300. The target file size may be changed.

The user input unit 212 is used to set scanning options of a document to be scanned, e.g., resolution, color format, file compression format, brightness, etc. using an option setting screen displayed on the display unit 214. The set scanning options selected by the user are stored in the storage unit 250.

The display unit 214 is driven by the controller 290 to display a current status of the image forming apparatus 200, an initial file size of the scanned image, a resized file size of the scanned image, the scanning options, etc. The display unit 214 also displays various user interface (UI) screens and various guide messages generated by the image processor 230, which will be described later. The display unit 214 may include a liquid crystal display (LCD), a cathode ray tube (CRT), a plasma display unit panel (PDP), or the like.

The scanning unit 220 scans the document, based on the pre-set scanning options, to generate the scanned image. Thus, the initial file size of the generated scanned image varies depending on the pre-set scanning options.

The operation of the scanning unit 220 will now be briefly described. The scanning unit 220 scans the document using a charged coupled device (CCD) or a contact image sensor (CIS), transforms the scanned image into a digital signal, and outputs a final scanned image. The resolution, file size, etc. of the scanned image may be adjusted by the image processor 230, and then the scanned image may be stored in at least one of the storage unit 250 and the external memory 100 and/or may be printed by the printing engine 260.

The image processor 230 performs image processing such as shading, gamma correction, dot per inch (DPI) transformation, edge emphasis, error diffusion, scaling, etc. on the scanned image input from the scanning unit 220.

The image processor 230 also transforms the resolution, file format, file size, etc., of the scanned image as input from the scanning unit 220 into a resolution, a file format, a file size, etc., using the default scanning options if the user has not changed the options. The transformed image is stored in the storage unit 250 or the external memory 100, transmitted to a personal computer (PC) 300, and/or printed by the printing engine 260.

If a first mode is selected by the user, then the target file size is set by the user at the input unit 212. The image processor 230 resizes the initial scanned image so that the re-sized file size of the scanned image maximally approaches the target file size set by the user, and performs the above-mentioned image processing on the resized image.

The image processor 230 also generates various UI screens as shown in FIGS. 4A through 4F and a guide message related to the quality of the scanned image or the quality of the resized scanned image.

The printing engine 240 may form an image on a printing sheet such as paper. The printing engine 240 heats and pressurizes the printing sheet at an appropriate temperature to fix and fuse the image onto the printing sheet and performs a printing job according to the pre-set printing options.

The storage unit 250 stores the scanned image having the file size as resized by the image processor 230 in a pre-set file format. The storage unit 250 also stores the file size selected by the user to be applied during storing of the scanned image. The image processor 230 resizes the scanned image generated by the scanning unit 220 so that the file size maximally approaches (becomes maximally close to) the target file size stored in the storage unit 250.

The storage unit 250 also stores scanning options, printing options, etc., which are set by the user at the input unit 212 or are pre-set during the manufacturing process. If the scanning options and the printing options are changed by the user at the input unit 212, the storage unit 250 may also store the new values of the changed scanning and printing options.

The first interface 260 is a connector to which the external memory 100 is connected. It receives a file stored in the external memory 100 or outputs a file stored in the image forming apparatus 200 to the external memory 100. A plurality of external memories 100 may be used, and the first interface 260 may include a plurality of interfaces to correspond to the number of external memories 100. More specifically, the first interface 100 may include a plurality of interfaces all having a same structure mating with the external memories 100. Alternatively, a plurality of external memories 100 of different configuration may be used, and in this case, the first interface 260 may include a plurality of interfaces of varying structures to correspond to the various external memories 100.

The second interface 270 is for connection to a PC 300 through a cable such as a USB cable. It receives printing data of a document written in the PC 300, and provides the printing data to the printing engine 240. The second interface 270 also transmits the scanned image generated by the scanning unit 220 to the PC 300. The second interface 270 may be a network interface card (NIC).

The ROM 280 stores various control programs necessary for realizing the function and operation of the image forming apparatus 200, a program for controlling scanning, a program for processing an image, etc.

The RAM 285 temporarily stores various types of data generated during the operation of the image forming apparatus 200. For example, the RAM 285 temporarily stores the file size of the scanned image resized by the image processor 230.

The controller 290 controls the operation of the image forming apparatus 200 using the various stored control programs and controls input and output of signals between the above-described blocks.

In particular, if a signal to select the first mode is received from the user input unit 212, the controller 290 controls the scanning unit 220 to scan the document so as to generate a scanned image corresponding to the scanning options set by the user. The controller 290 also controls the image processor 230 to resize the generated scanned image so that the resized file size of the scanned image maximally approaches the target file size stored in the storage unit 250. If the first mode has been selected, and the target file size has been input from the user input unit 212, the image processor 230 may resize the scanned image so that the scanned image approaches the target file size selected by the user.

The controller 290 also compares the initial file size of the scanned image generated by the scanning unit 220 with the file size of the resized image. If the file size of the resized image is smaller than the initial file size of the scanned image, the controller 290 controls the image processor 230 to generate a message warning that the quality of the resized image may be deteriorated and then drives the display unit 214 to display the generated message.

If a currently scanned document is resized, the controller 290 provides scanning option information (e.g., resolution) optimal for maximally approaching a maximum size of a file to be resized, i.e., the target file size, and displays the optimal scanning option information. The optimal scanning option information is computed by the controller 290 in consideration of the initial file size of the scanned image and the target file size, or is pre-stored in a table format.

If the user changes at least one of the optimal scanning option information and the target file size via the user input unit 212, the controller 290 drives the scanning unit 220 and the image processor 230 to re-generate an image corresponding to the changed value. The re-generated image is temporarily stored in the RAM 285.

If a signal to request storing of the re-generated image in the external memory 100 is received from the user input unit 212, the controller 290 reads the image temporarily stored in the RAM 285, outputs the image to the first interface 260, and controls the first interface 260 to transmit the image to the external memory 100.

If the file size of the resized image is larger than the initial file size of the scanned image, the controller 290 stores the resized image in at least one of the external memory 100 and the storage unit 250. The first interface 260 transmits the resized image to the external memory 100.

Figure 3:
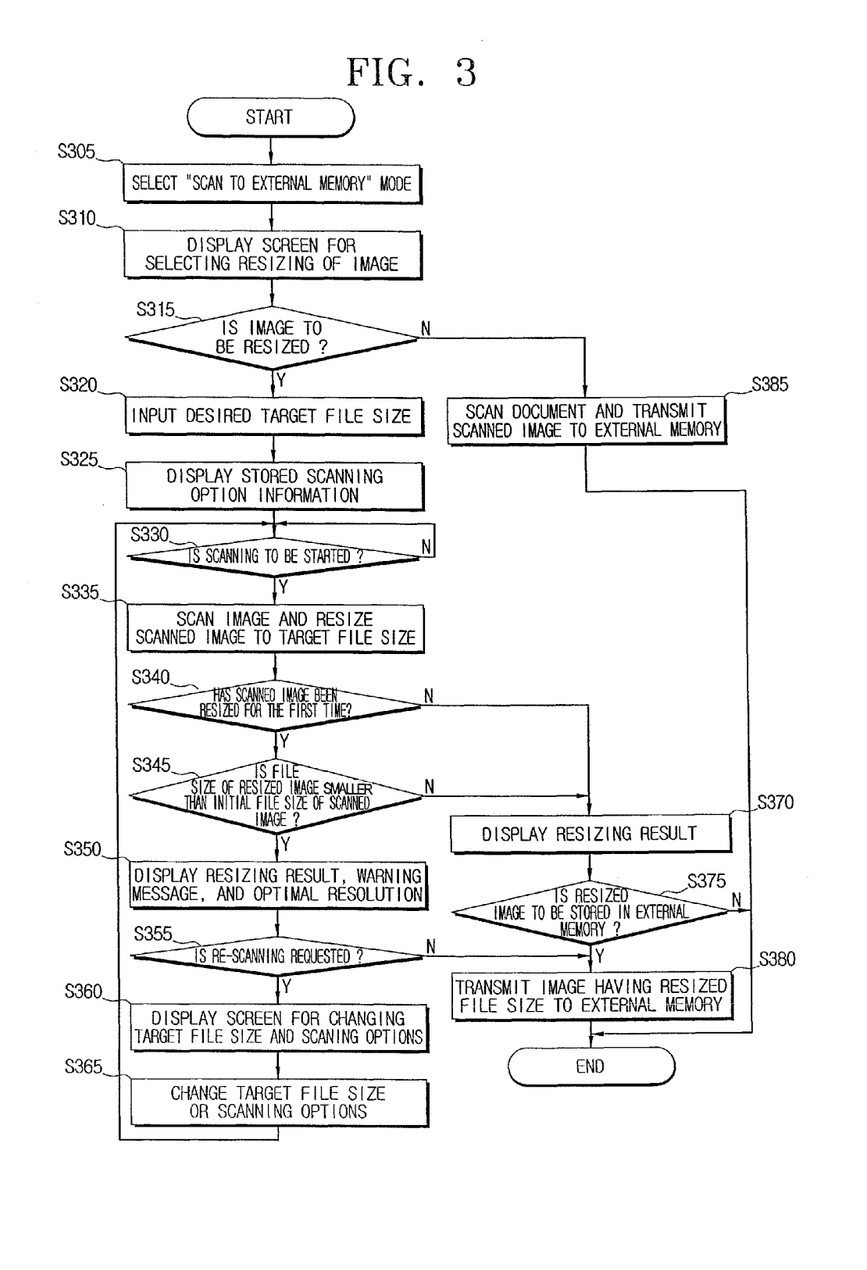
FIG. 3 is a flowchart of a method for resizing an image of the image forming apparatus illustrated in FIG. 2, according to an embodiment of the present invention general inventive concept.

FIG. 3 is a flowchart illustrating a method of resizing an image in the image forming apparatus 200 illustrated in FIG. 2, according to a the first embodiment of the present invention general inventive concept. FIGS. 4A through 4F are views illustrating UI screens generated by the image processor 230 illustrated in FIG. 2, also according to an embodiment of the present invention general inventive concept. Referring to FIGS. 2 and 3, in operation S305, scanning options necessary for operating in the first mode are set via the user input unit 212, and the first mode is selected. In operation S310, the controller 290 controls the image processor 230 and the display unit 214 to generate and display a UI screen of FIG. 4A to select whether a scanned image is to be resized. Here, the first mode is referred to as a "Scan to External Memory" mode because a scanned image generated by scanning is stored in the external memory 100, and the set scanning options are stored in the storage unit 250.

Figure 4A:
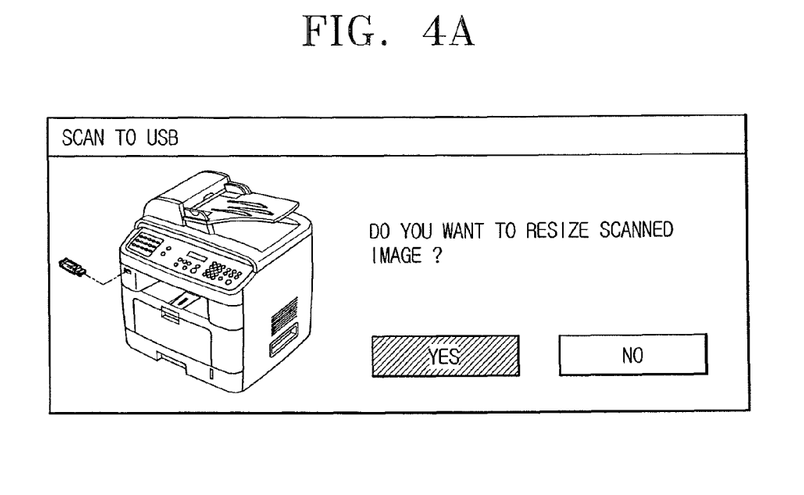
FIGS. 4A through 4F are views illustrating user interface (UI) screens generated by an image processor illustrated in FIG. 2, according to an embodiment of the present invention general inventive concept.
Figure 4B:
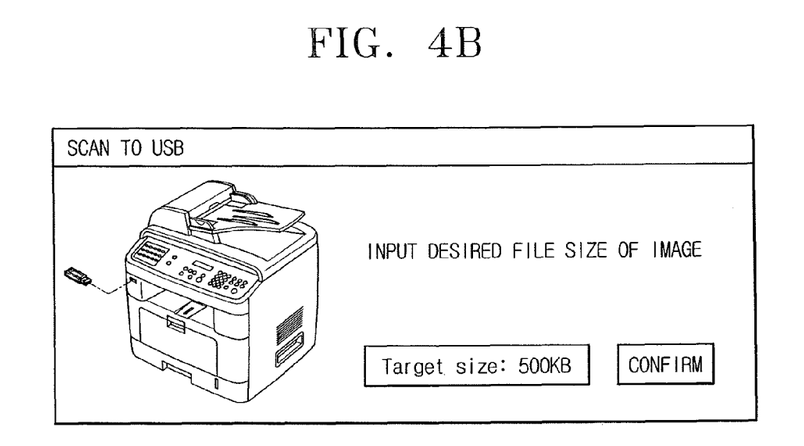

If "Yes" is selected on the UI screen as shown in FIG. 4A in operation S315, the controller 290 determines that resizing of the scanned image is requested and receives from the user a target file size through the UI screen shown in FIG. 4B, corresponding to operation S320 in FIG. 3. In FIG. 4B, the user has input "500 KB" (500 kilobytes) as the target file size.

Figure 4C:
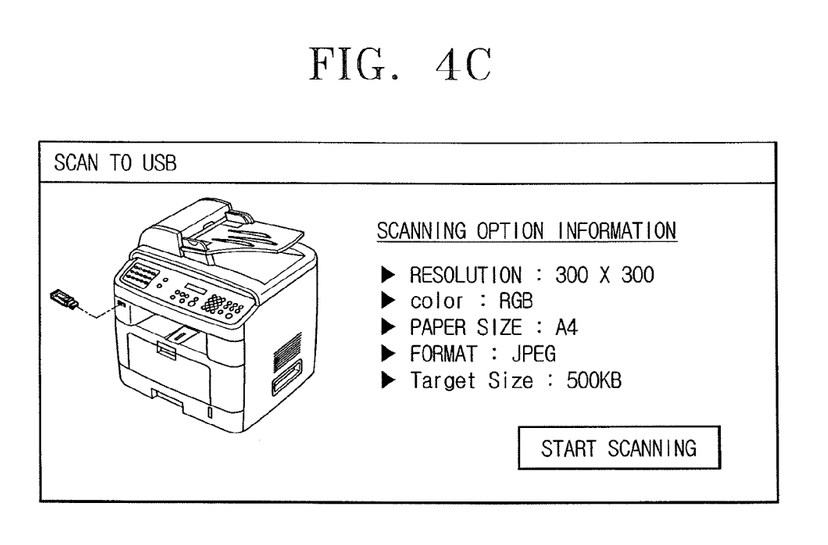

If a user inputs a maximum size of a file to be resized, i.e., the target file size, and then selects "Confirm" using the user input unit 212 in operation S320, the controller 290 drives the image processor 230 and the display unit 214 to read out scanning option information stored in the storage unit 250, accept the scanning option information and the target file size input by the user in operation S320, and display scanning options as shown in FIG. 4C. Referring to the example of FIG. 4C, the user has set scanning options including a resolution to "300×300" pixels, a color format to "RGB," an image size to "A4," a file compression format to "JPEG" and the target file size to "500 KB".

If "Start Scanning" is selected through the UI screen shown in FIG. 4C corresponding to operation S330, the controller 290 drives the scanning unit 220 to scan the document so as to generate a scanned image and then drives the image processor 230 to resize the scanned image according to the target file size set in operation S335. Thus, the image processor 230 resizes the scanned image so that the resized file size of the scanned image maximally approaches the target file size set by the user, and the resized file size is equal to or smaller than the target file size.

In operation S340, the controller 290 determines whether the scanned image that was generated in operation S335 has been resized for the first time. If it is determined that the scanned image has been resized for the first time, the controller 290, in operation S345, compares the initial file size of the scanned image generated in operation S335 with the resized file size.

Figure 4D:
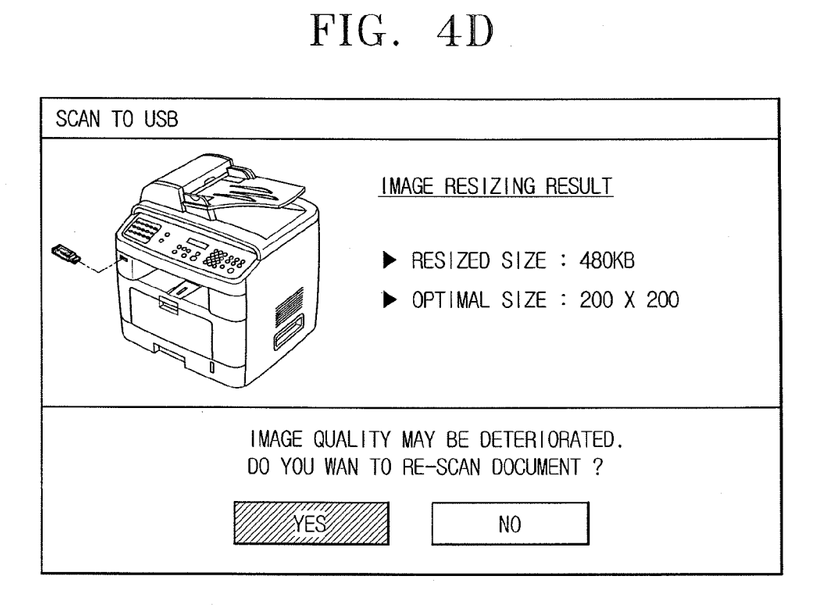
Figure 4E:
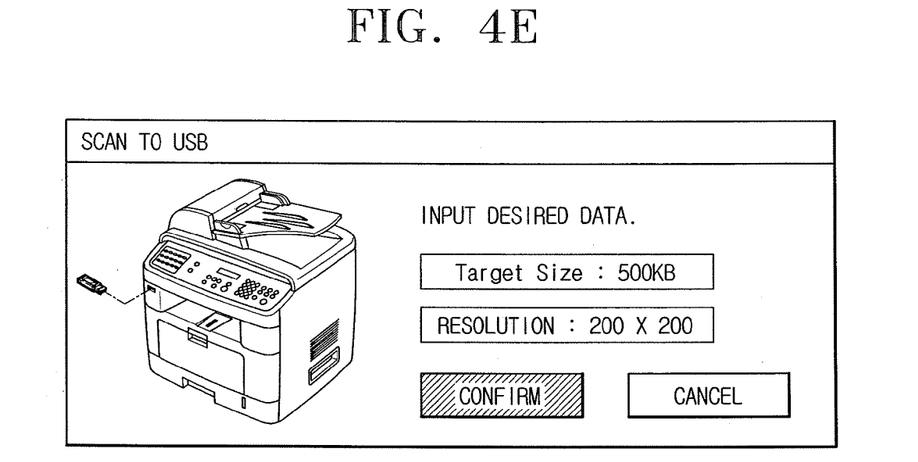

If the file size of the resized image is smaller than the initial file size (i.e., there is less data), the controller 290 drives the image processor 230 and the display unit 214 to generate and display a UI screen such as illustrated in FIG. 4D (operation S350). In FIG. 4D, the UI screen displays a resized file size "480 KB" and a guide message warning of the possibility that the quality of the resized image has deteriorated during storing of the resized image. The UI screen also displays optimal scanning option information for the target file size, e.g., optimal resolution "200×200," and a message asking about whether scanning is to be re-performed. The UI screen may also show other information such as the initial file size and resolution for comparison, and/or other information that might help the user make a decision, If the user selects "Yes" on the UI screen shown in FIG. 4D to request re-scanning of the document in operation S355, the controller 290 controls the image processor 230 and the display unit 214 to generate and display a UI screen as illustrated in FIG. 4E and operation S360. The UI screen displayed in operation S360 is used to change the target file size and the resolution and may be designed so as to change other scanning options such as the file compression format, etc.

If the user changes the target file size or the resolution and then selects "Confirm" in operation S365 (FIG. 4E), the controller 290 re-performs operations S330 through 340. In operation S365 the user may input the optimal resolution "200×200" suggested in operation S350, either change or maintain the target file size that was input in operation S320, and keep the resized file size at any value which does not exceed the target file size, so as to obtain a high quality image.

Figure 4F:
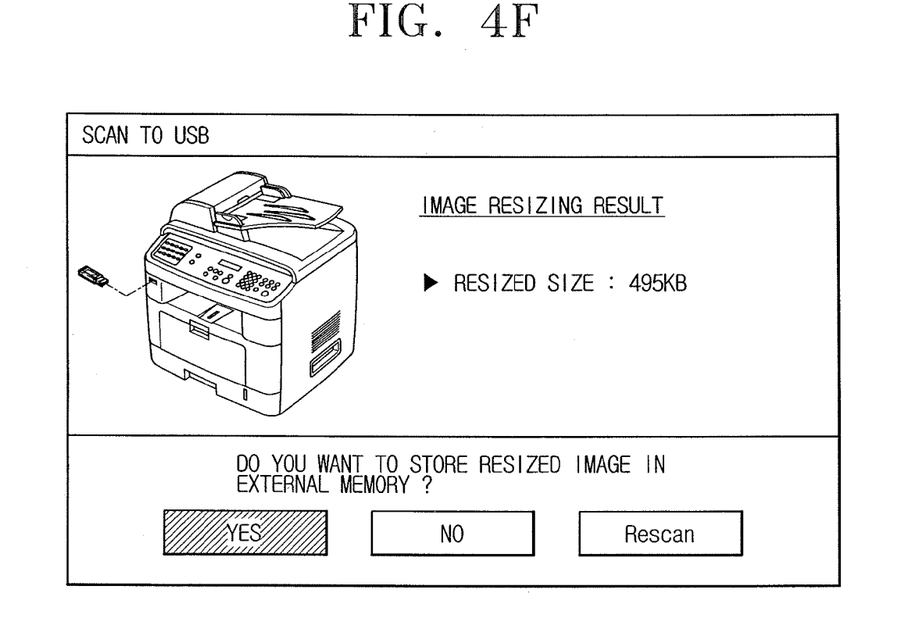

Since the currently scanned (re-scanned) image may have been resized for a second time, in operation S335, in the second pass through operation S340, the controller 290 drives the image processor 230 and the display unit 214 to display a result of the second resizing of the currently scanned image (FIG. 4F and operation S370). Referring to FIG. 4F, the file size of the image resized a second time has been changed to "495 KB." (This is only an example, and the file size may be maintained at 480 KB.) Since the resolution is changed into the optimal resolution in operation S365, a quality of an image of the file displayed in operation S370 is improved. The reason is that scanning on the basis of pixels (1/300)th of an inch across (the initially expected 300×300 resolution), and then converting the image to pixels (1/200)th of an inch across (200×200) creates artifacts which deteriorate the image. When scanning is performed on the basis of pixels the same size as the pixels in the resulting image, the image quality is improved. According to the present embodiment, it is possible that a user may set a new resolution different from or higher than a current resolution of the target size if the file size does not exceed the target size to provide a better image quality. For example, if the target size is set to 500 KB, the user may change the scanning from 200 DPI to 300 DPI to improve the resolution of the scanned image when the scanning with 300 DPI has a file size of 490 KB which does not exceed the target size of 500 KB.

If "Yes" is selected through the user input unit 212 in operation S375, the controller 290 drives the first interface 260 to transmit an image generated by the second time resizing, i.e., an image having the file size of 495 KB, to the external memory 100 (operation S380). Thus, a scanned image having a file size approaching a target file size desired by the user together with an optimal quality is stored in the external memory 100.

If it is determined in operation S345 that the file size of the resized image is larger than the initial file size of the scanned image, the controller 290 performs operations S370 through S380.

If "No" is selected on the UI screen as shown in FIG. 4A in operation S315, the controller 290 determines that resizing of the scanned image is not requested and controls the scanning unit 220 and the first interface 260 to scan the document, generate the scanned image, and transmit the scanned image to the external memory 100 in operation S385.

In the first embodiment, the user may set a target file size necessary for resizing before scanning a document. Also, the image processor 230 resizes the scanned image so that a file size of the scanned image approaches the set target file size. If the quality of the scanned image is deteriorated, the image processor 230 may inform the user of a guide message and information such as an optimal resolution for preventing the deterioration of the quality. Thus, the user may store an image having a higher quality and a desired file size in an external memory.

In the present embodiment, optimal scanning options necessary for approaching a target file size may be displayed on the display unit 214 after a document is scanned to generate a scanned image. In other words, the controller 290 may compute the optimal scanning options (e.g., an optimal resolution) in consideration of an initial file size of the generated scanned image and the target file size input by the user and display the scanned image before the scanned image is resized so as to approach the target file size. As a result, the user may further easily and quickly set an optimal target file size or the optimal scanning options.

Figure 5:
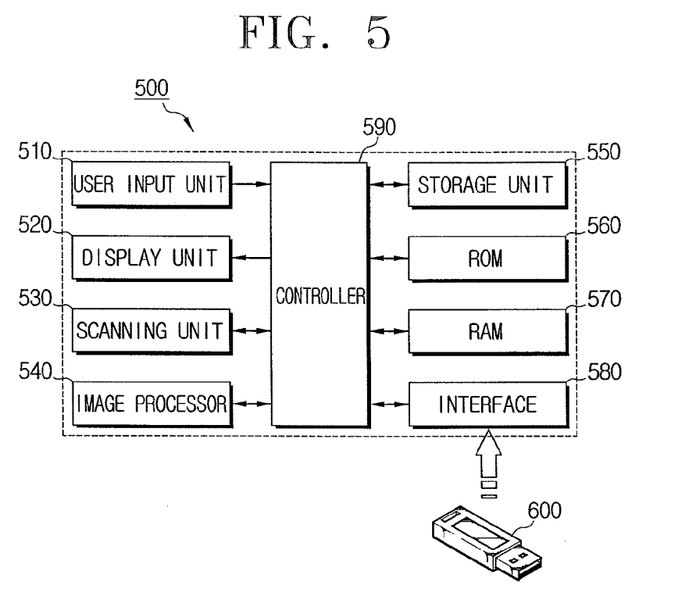
FIG. 5 is a schematic block diagram of an image forming apparatus capable of resizing an image, according to another embodiment of the present invention general inventive concept.
Figure 6A:
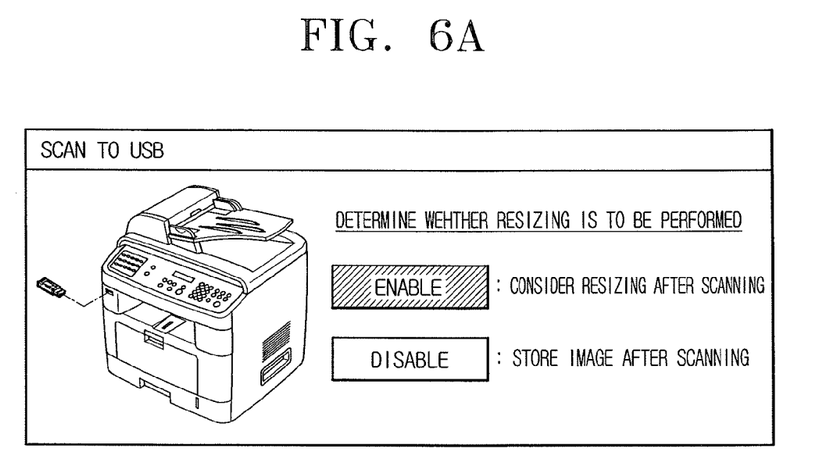
FIGS. 6A through 6C are views illustrating UI screens generated by an image processor illustrated in FIG. 5, according to an embodiment of the present invention general inventive concept.
Figure 6B:
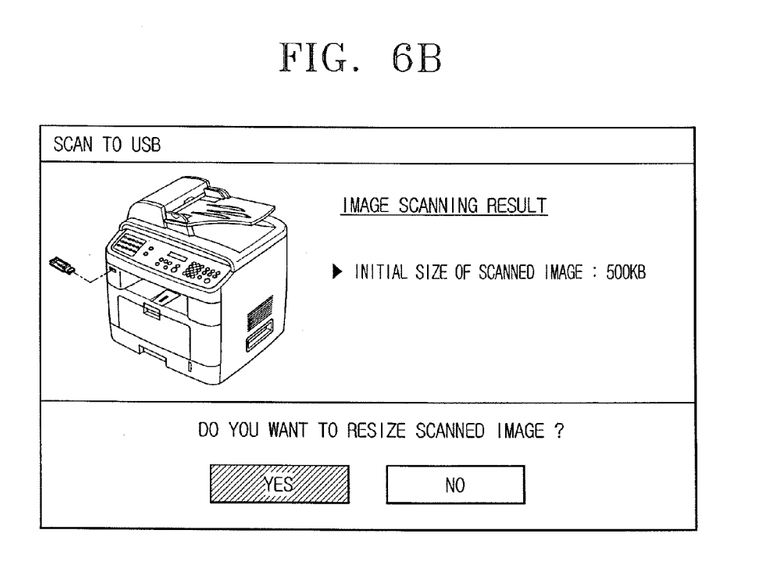
Figure 6C:
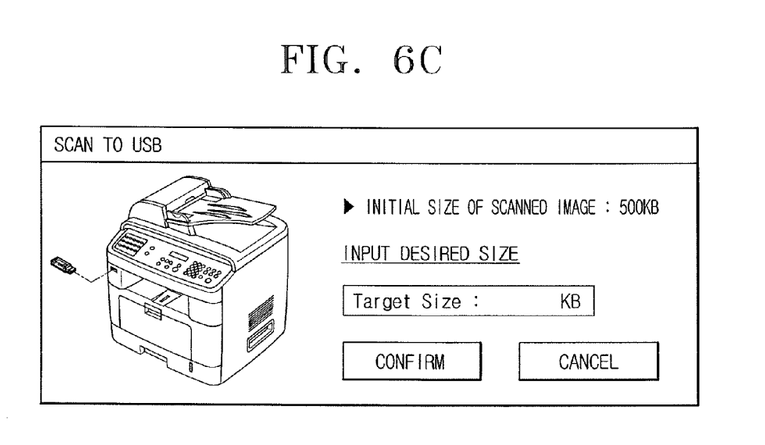

FIG. 5 is a schematic block diagram of an image forming apparatus capable of resizing an image, according to a second embodiment of the general inventive concept, and FIGS. 6A through 6C are views illustrating UI screens generated by an image processor illustrated in FIG. 5.

Referring to FIG. 5, an image forming apparatus 500 according to the present embodiment includes a user input unit 510, a display unit 520, a scanning unit 530, an image processor 540, a storage unit 550, a ROM 560, a RAM 570, an interface 580, and a controller 590. The image forming apparatus 500 shown in FIG. 5 may include the same elements as the image forming apparatus 200 shown in FIG. 2, and thus only elements under discussion in relation to the second embodiment will be illustrated for convenience.

The user input unit 510, the display unit 520, the scanning unit 530, the image processor 540, the storage unit 550, the ROM 560, the RAM 570, and the interface 580 shown in FIG. 5 respectively perform the almost same functions as the user input unit 212, the display unit 214, the scanning unit 220, the image processor 230, the storage unit 250, the first interface 260, the ROM 280, and the RAM 285 of FIG. 2. Thus, their detailed descriptions will be omitted herein.

The image forming apparatus 500 according to the present second embodiment may determine whether resizing is to be performed before scanning is performed, display an initial file size of a scanned image generated by scanning a document, and receive a target file size to be applied for resizing through the user input unit 510.

The user initially determines whether the scanned image is to be resized, through a UI screen such as shown in FIG. 6A. If the user selects "Enable" on the UI screen (using the user input unit 510), the controller 590 stores a flag "1" corresponding to "Enable" in the storage unit 550.

If "Enable" is selected, the first mode is set. Then, if scanning of a document is requested through the user input unit 510, the controller 590 drives the scanning unit 530, the image processor 540, and the display unit 520 to scan the document, generate a scanned image, and display an initial file size of the scanned image as shown in FIG. 6B. If a target file size is input through a UI screen as shown in FIG. 6C, the image processor 540 resizes the initial file size of the scanned image so that the initial file size approaches the target file size input by the user.

If "Disable" is selected, the controller 590 stores a flag "0" corresponding to "Disable" in the storage unit 550. If "Disable" has been set, and then the scanning of the document is requested from the user input unit 510, the controller 590 drives the scanning unit 530 and the interface 580 to scan the document, generate the scanned image, and transmit the generated scanned image to an external memory 600. Also, if "Disable" has been set, and then the first mode is selected, the controller 590 drives the image processor 540 and the display unit 520 to generate and display a message for warning of the impossibility of the scanned image being resized.

Figure 7:
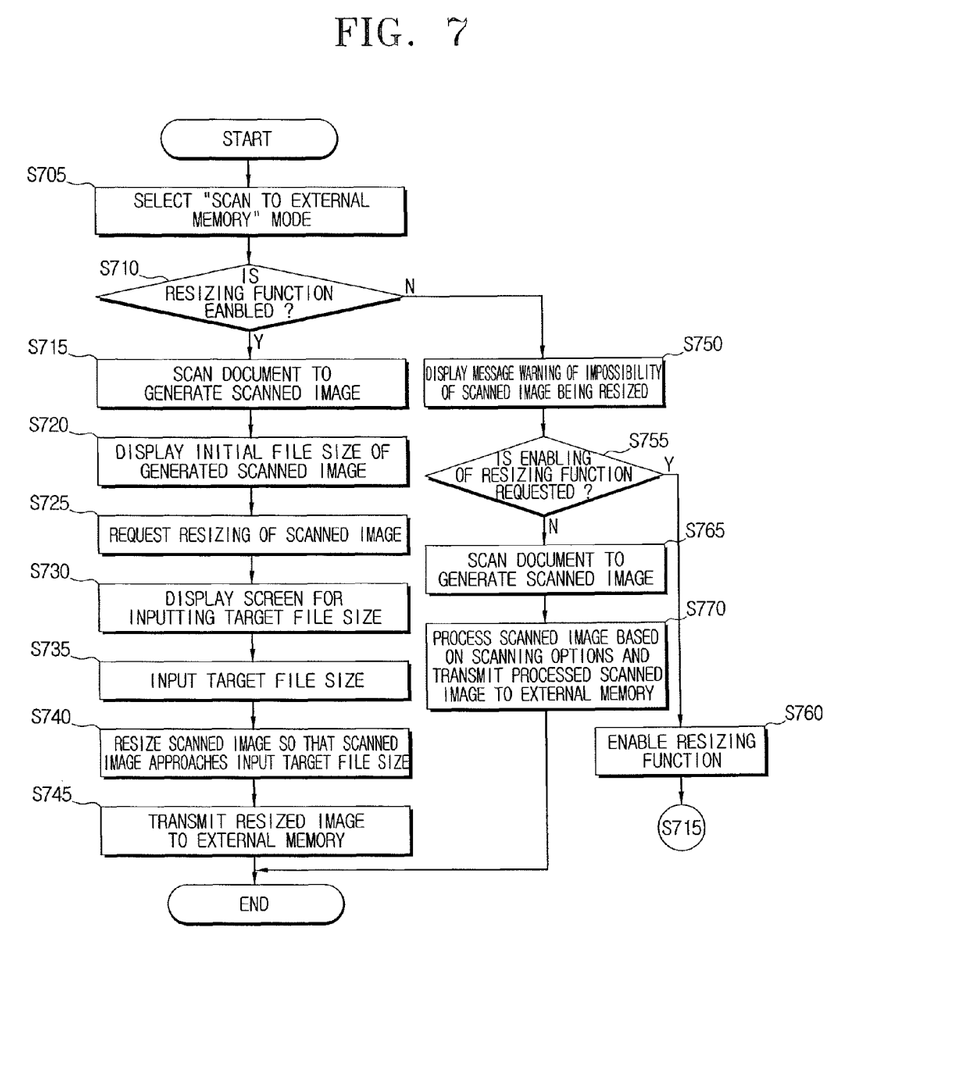
FIG. 7 is a flowchart of a method for resizing an image of the image forming apparatus illustrated in FIG. 5, according another embodiment of the present invention general inventive concept.

FIG. 7 is a flowchart of a method for resizing an image of the image forming apparatus 500 illustrated in FIG. 5, according to the second embodiment. Referring to FIGS. 5 through 7, in operation S705, a first mode is selected through the user input unit 510. In operation S710, the controller 590 checks a flag stored in the storage unit 550 to determine whether a resizing function is enabled. If the flag related to the resizing function is stored in the storage unit 550 as "1", the controller 590 determines that the resizing function is enabled and controls the scanning unit 530 to scan a document so as to generate a scanned image in operation S715.

In operation S720, the controller 590 drives the image processor 540 and the display unit 520 to generate and display a UI screen of FIG. 6B displaying an initial file size of the scanned image that was generated in operation S715. Referring to FIG. 6B, the user may check the initial file size of the scanned image and request resizing of the scanned image using the user input unit 510.

In operation S725, "Yes" is selected to request resizing of the scanned image on the UI screen shown in FIG. 6B. In operation S730, the controller 590 drives the image processor 540 and the display unit 520 to generate and display the UI screen of FIG. 6C through which the target file size is accepted. The user inputs the file size using a keypad (not illustrated in FIG. 6C; see FIG. 1).

In operation S735, the target file size is input and "Confirm" is selected on the UI screen shown in FIG. 6C using the user input unit 510. In operation S740, the controller 590 controls the image processor 540 to resize the scanned image so that the initial file size of the scanned image approaches the input target file size.

In operation S745, the controller 590 controls the interface 580 to transmit the resized image to the external memory 600.

If it is determined in operation S710 that the resizing function is disabled, the controller 590 drives the image processor 540 and the display unit 520 to generate and display a message warning of the impossibility of the document to be scanned being resized in operation S750.

In operation S755, the user manipulates the user input unit 510 to request enabling of the resizing function through the UI screen shown in FIG. 6A. In operation S760, the controller 590 enables the resizing function. In other words, flag "0" stored in the storage unit 550 is changed into flag "1." The controller 590 also drives the image forming apparatus 500 to return to operation S715.

If it is determined in operation S755 that enabling of the resizing function is not requested, the controller 590 drives the scanning unit 530 to scan the document so as to generate the scanned image in operation S765.

In operation S770, the controller 590 drives the image processor 540 and the interface 580 to process the scanned image based on scanning options and to transmit the processed scanned image to the external memory 600.

A computer-readable medium may embody any or all operations of the general inventive concept discussed herein. The computer-readable medium may include a computer-readable recording medium and a computer-readable transmission medium. The computer-readable recording medium contains computer-readable codes as a program to execute the above-described method. The computer-readable recording medium is any data storage device that can store data which can be thereafter read by a computer system. Examples of the computer-readable recording medium include ROM, RAM, CD-ROM, DVD-ROM, magnetic tape, floppy disks, optical data storage devices. The computer-readable recoding medium can be distributed over network-coupled computer systems so that the computer readable code is stored and executed in a distributed fashion. The computer-readable transmission medium can transmit carrier waves and signals (e.g., wired or wireless data transmission through the Internet). Also, functional programs, codes, and code segments to accomplish the present general inventive concept can be easily construed by programmers skilled in the art to which the present general inventive concept pertains.

According to the present embodiment, the user may scan the document and then set the target file size to be applied for resizing with reference to the initial file size of the scanned image. In other words, if it is determined that the initial file size of the scanned image is small enough to deteriorate the quality of the scanned image, the user may input a target file size larger than the initial file size in operation S735. Thus, the user may expand a file size of the scanned image.

If the initial file size of the scanned image is larger than a size desired by the user, the user may input a target file size equal to or smaller than the initial file size in operation S735. Thus, the user may omit a process of repeatedly inputting a target file size until an image having a desired size is obtained and further conveniently store the image having the desired size in the external memory 600.

In the above-described embodiments of the general inventive concept, the "Scan to External Memory" function is performed through different processes. However, functions realized in the above-described embodiments may be realized in one image forming apparatus. In this case, the user may select one of the modes described above and then request an operation of the selected mode of the image forming apparatus.

As described above, in an image forming apparatus capable of resizing an image and a method thereof according to embodiments of the present general inventive concept, a scanned image to be stored in an external or internal memory can be resized to a size desired by a user and then stored in the image forming apparatus. Thus, the user can save the trouble of re-editing the size of the stored image when using the stored image.

In addition, a guide message can be provided to the user, for warning of a possibility of the quality of the scanned image being deteriorated during resizing of the scanned image. In addition, optimal scanning options such as optimal resolution, brightness, etc. can be provided to the user. Thus, the scanned image can be resized with minimal deterioration of the quality of the scanned image. As a result, the user can store an image having a high quality and a desired file size in the external memory.

Moreover, the user can scan a document and set a target file size to be applied for resizing with reference to an initial file size of the scanned image. In other words, if the initial file size of the scanned image is larger than the size desired by the user, the user can set a target file size equal to or smaller than the initial file size. Thus, the user can avoid repeatedly inputting a target file size until an image having a desired file size is obtained and also can conveniently store the image having the desired file size in the external or internal memory.

If the file size of the scanned image is larger than a size storable in the external memory, the user can avoid the trouble of adjusting scanning options to reduce the file size of the scanned image and then re-scanning the document to reduce the file size of the scanned image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus to resize an image, comprising:
   a scanning unit to scan a document to generate an image;
   a storage unit to store a target file size to be applied during storing of the generated image, the target file size being a measure of an amount of physical storage to be occupied by the file;
   an image processor to resize an initial file size of the image generated by the scanning unit so that the initial file size is smaller than the target file size; and
   a controller to store an image having the resized file size in at least one of an external memory connected to the image forming apparatus or the storage unit installed in the image forming apparatus,
   wherein if an enable mode to request setting of the target file size is selected by a user interface, the controller controls a display unit to display the initial file size of the image, and if a disable mode not to request the setting of the target file size is selected, the controller stores the image having the initial file size in at least one of the external memory and an internal memory different from the storage unit.

2. The image forming apparatus as claimed in claim 1, further comprising:
a display unit to display a guide message related to a quality of the resized image generated by the image processor.

3. The image forming apparatus as claimed in claim 2, wherein if the resized file size is smaller than the initial file size, the controller controls the display unit to display a message indicating a quality of the resized image.

4. The image forming apparatus as claimed in claim 2, wherein the controller controls the display unit to display an optimal resolution in which the resized image is close to the target file size.

5. The image forming apparatus as claimed in claim 4, further comprising:
a user interface to input the optimal resolution,
wherein if the optimal resolution is input, the controller controls the scanning unit to re-scan the document and generate an image corresponding to the input optimal resolution.

6. The image forming apparatus as claimed in claim 2, wherein the controller controls the display unit to display an optimal resolution in which the scanned image approaches the target file size before the image processor resizes the file size of the scanned image.

7. The image forming apparatus as claimed in claim 1, further comprising a user interface to change the target file size,
wherein the controller controls the storage unit to store the target file size changed by the user interface.

8. The image forming apparatus as claimed in claim 1, further comprising an interface to which the external memory is connected.

9. An image forming apparatus to resize an image, comprising:
a scanning unit to scan a document to generate an image;
a display unit to display an initial file size of the generated image;
a user interface to set a target file size to be applied during storing of the generated image, the target file size being a measure of an amount of physical storage to be occupied by a file;
an image processor to resize the initial file size of the generated image so that the initial file size of the generated image is smaller than the set target file size; and
a controller to store an image having the resized file size in at least one of an external memory connected to the image forming apparatus or an internal memory installed in the image forming apparatus,
wherein if an enable mode to request setting of the target file size is selected by a user interface, the controller controls a display unit to display the initial file size of the image, and if a disable mode not to request the setting of the target file size is selected, the controller stores the image having the initial file size in at least one of the external memory and an internal memory different from the storage unit storing the target file size.

10. The image forming apparatus as claimed in claim 9, wherein the target file size is set when the initial file size is displayed.

11. A method of resizing an image, comprising:
setting a target file size to be applied during storing of an image generated by scanning, the target file size being a measure of an amount of physical storage to be occupied by a file;
if the scanning is requested, scanning a document to generate the image;
resizing an initial file size of the generated image so that the initial file size of the generated image is smaller than the set target file size;
storing the image having the resized file size in at least one of external or internal memories;
selecting an enable mode to request the setting of the target file size and a disable mode not to request the setting of the target file size;
displaying the initial file size of the image if the enable mode is selected; and
storing the image having the initial file size in at least one of the external memory and an internal memory different from a storage unit storing the target file size if the disable mode is selected.

12. The method as claimed in claim 11, further comprising, after resizing the initial file size of the generated image so that the initial file size of the generated image approaches the set target file size:
comparing the resized file size with the initial file size; and
displaying a guide message indicating a quality of the resized image if the resized file size is smaller than the initial file size.

13. The method as claimed in claim 12, further comprising, after displaying the guide message for warning of the deterioration of the quality of the resized image:
generating an optimal resolution in which the resized image approaches the set target file size, and
displaying the generated optimal resolution along with the generated guide message.

14. The method as claimed in claim 13, further comprising, after displaying the generated guide message:
re-scanning the document to re-generate an image corresponding to the input optimal resolution if the optimal resolution is input through a user interface, and
storing the re-generated image in at least one of the external and internal memories.

15. The method as claimed in claim 11, further comprising, before resizing the initial file size of the generated image so that the initial file size of the generated image is close to the set target file size:
displaying an optimal resolution in which the scanned image has the set target file size.

16. A method of resizing an image, comprising:
scanning a document to generate an image;
displaying an initial file size of the generated image;
resizing the initial file size of the generated image so that the initial file size is smaller than a set target file size, the set target file size being a measure of an amount of physical storage to be occupied by a file;
storing an image having the resized file size in at least one of external or internal memories each being different from a storage unit storing the set target file size;
setting a target file size to be applied during storing of the generated image;
selecting an enable mode to request the setting of the target file size and a disable mode not to request the setting of the target file size;
displaying the initial file size of the image if the enable mode is selected; and
storing the image having the initial file size in at least one of the external or internal memories if the disable mode is selected.

17. A method of resizing an image, comprising:
scanning a document to produce first image data;

determining if the first image data has been converted to a coarser resolution for storage due to a requirement for more digital memory than is available in an external device;

determining whether or not the document should be rescanned at the coarser second resolution;

rescanning the document at the coarser second resolution;

setting the coarser resolution;

selecting an enable mode to request the setting of the coarser resolution and a disable mode not to request the setting of the coarser resolution;

displaying the coarser resolution of the image if the enable mode is selected; and storing the image having the coarser resolution in the external device if the disable mode is selected.

18. An image forming apparatus comprising:

an image processor to resize a scanned image having a scanned size according to a predetermined target size, the predetermined target size being a measure of an amount of physical storage to be occupied by the scanned image; and a controller to store the resized image having the predetermined target size in a memory being different from a storage unit storing the predetermined target size, wherein if an enable mode to request setting of the target file size is selected, the controller controls a display unit to display the initial file size of the image, and if a disable mode not to request the setting of the target file size is selected, the controller stores the image having the initial file size in the memory.

19. The image forming apparatus as claimed in claim 18, wherein the controller adjusts the predetermined target size to a second target size according to characteristics of the scanned image and the resized image.

20. The image forming apparatus as claimed in claim 19, wherein the image processor resizes a second scanned image having a second scanned size according to the adjusted target size, and the controller stores the resized image having the second target size in the memory.

21. A method of resizing an image, comprising:

scanning a document to generate an image file having an initial file size;

resizing image to change a size of a file from the initial file size to a predetermined target file size, the target file size being a measure of an amount of physical storage to be occupied by the file;

storing the resized file memory;

selecting an enable mode to request the setting of the target file size and a disable mode not to request the setting of the target file size;

displaying the initial file size of the image if the enable mode is selected; and storing the image having the initial file size in at least one of an external memory or an internal memory different from a storage unit storing the target file size if the disable mode is selected.

22. An image forming apparatus, comprising:

a scanner to scan a document to generate an image file having an initial file size;

an image processor to resize the image file from the initial file size to a predetermined target file size, the target file size being a measure of an amount of physical storage to be occupied by the file;

memory to store the resized image file, the memory being different from a storage unit storing the target file size; and a controller that controls a display unit to display the initial file size of the image when an enable mode to request setting of the target file size is selected, and stores the image having the initial file size in the memory when a disable mode not to request the setting of the target file size is selected.

* * * * *